March 18, 1969
E. R. CUNNINGHAM
3,433,908
DYNAMOELECTRIC MACHINE WINDING CIRCUIT
CONTROLLING SWITCH ASSEMBLY
Filed Aug. 26, 1966
Sheet 1 of 3
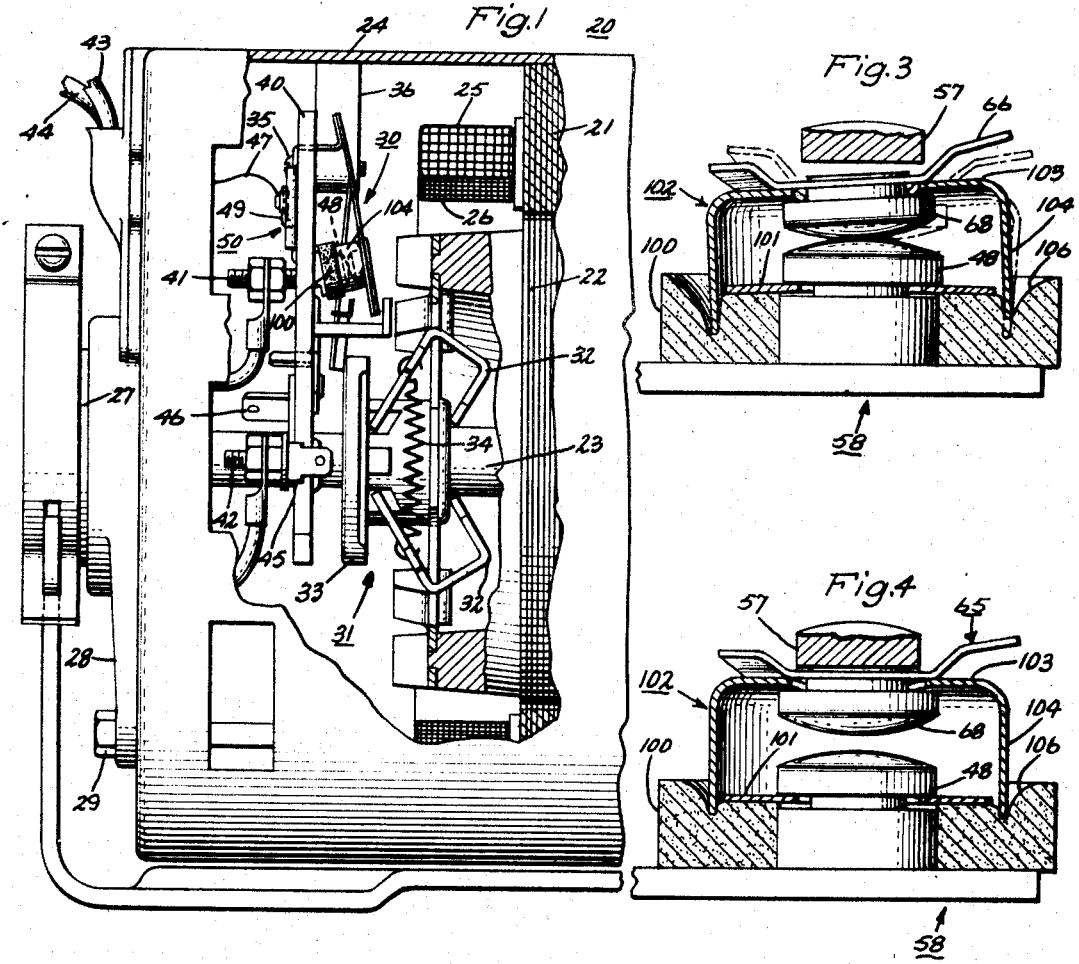
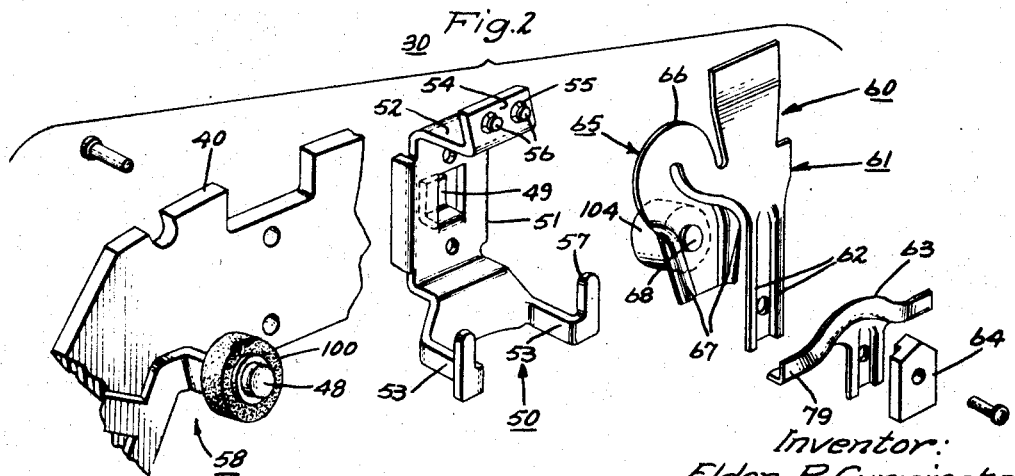
Inventor:
Eldon R. Cunningham,
by A. Sidney Alpert
Attorney.

March 18, 1969
E. R. CUNNINGHAM
3,433,908
DYNAMOELECTRIC MACHINE WINDING CIRCUIT
CONTROLLING SWITCH ASSEMBLY
Filed Aug. 26, 1966
Sheet 2 of 3
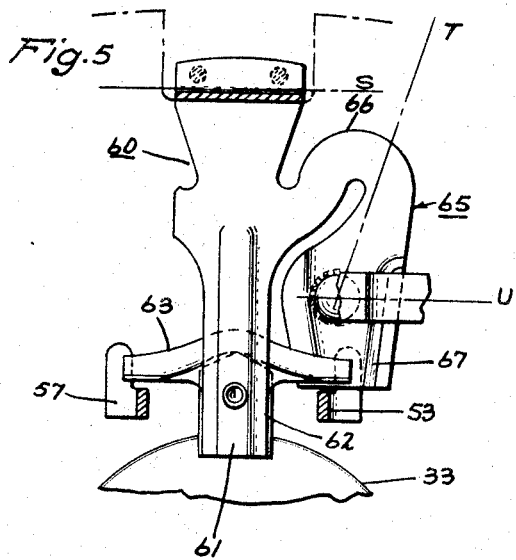
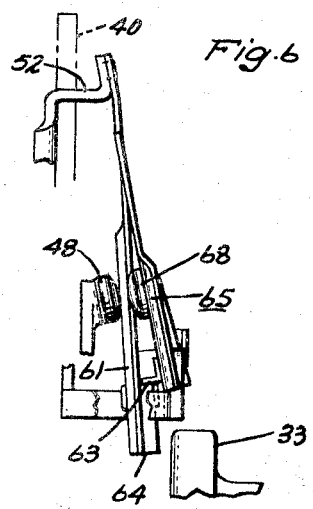
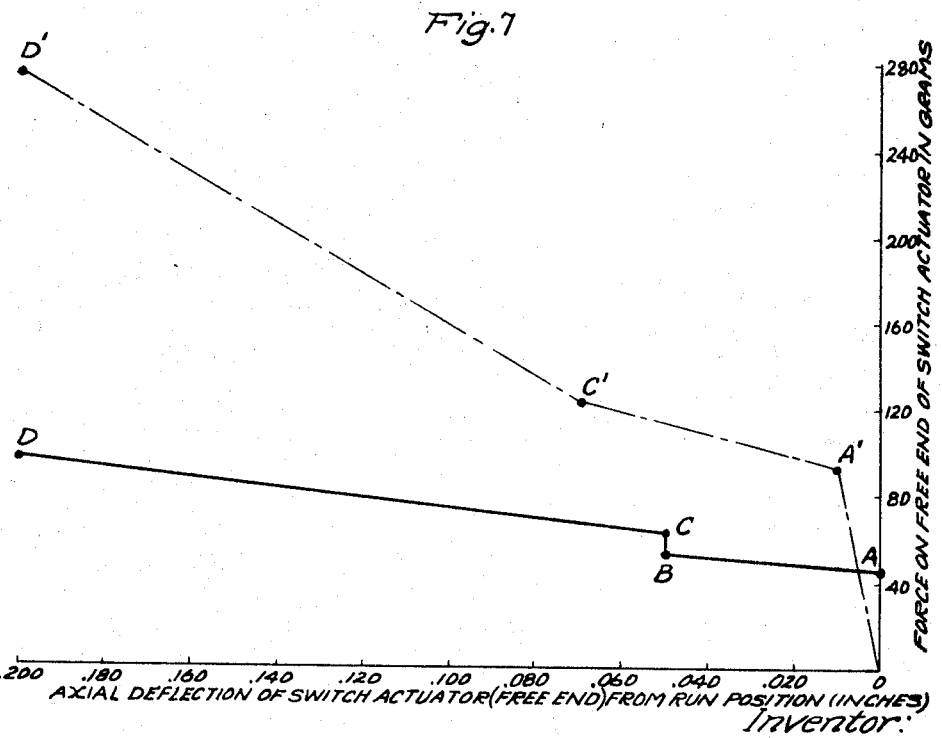
Inventor:
Eldon R. Cunningham,
by A. Sidney Olpert
Attorney.

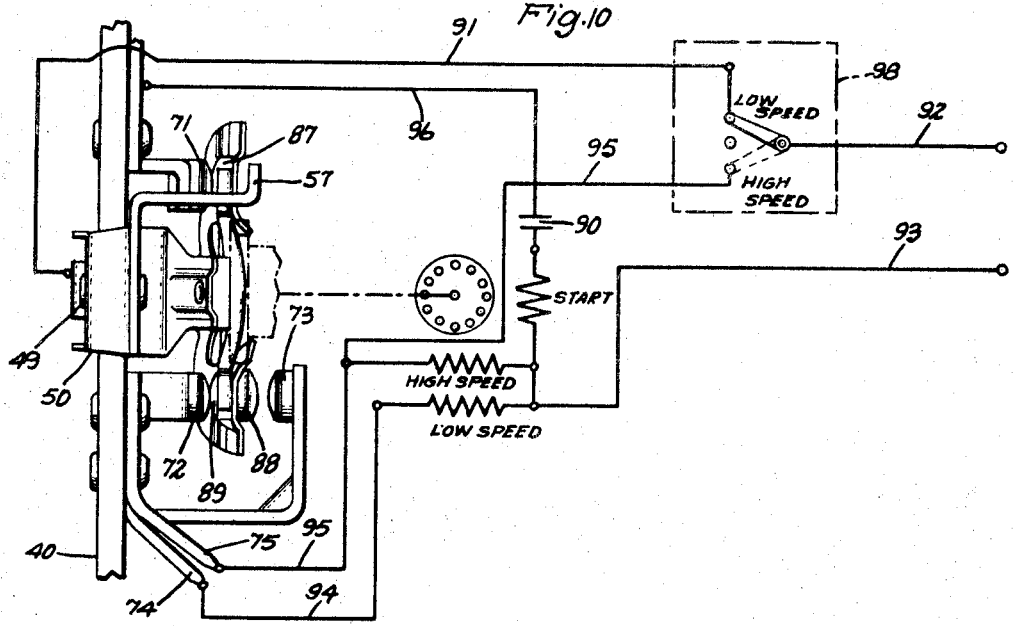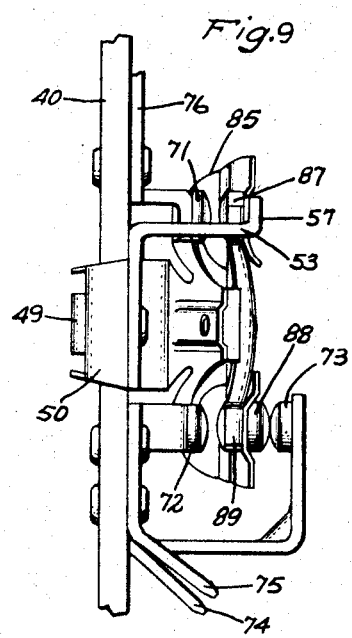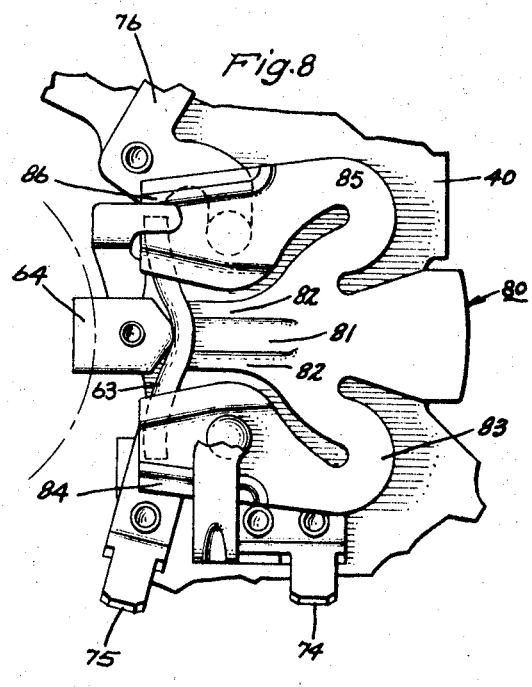

United States Patent Office 3,433,908
Patented Mar. 18, 1969

3,433,908
DYNAMOELECTRIC MACHINE WINDING CIRCUIT CONTROLLING SWITCH ASSEMBLY
Eldon R. Cunningham, Fort Wayne, Ind., assignor to General Electric Company, a corporation of New York
Filed Aug. 26, 1966, Ser. No. 575,287
U.S. Cl. 200—80    11 Claims
Int. Cl. H01h 35/10, 9/02, 21/04

ABSTRACT OF THE DISCLOSURE

A cutout switch for the starting winding of a single-phase electric motor has contacts which are arranged to open with an initial prying action. This is accomplished by having one contact stationary and by mounting the other on a spring offset arm which imparts a prying force to the contact when a force generally in alignment with the contact axes is applied to the spring offset arm.

---

This invention relates to switch assemblies for dynamoelectric machines, and more particularly to a switch assembly used in single phase induction motors for controlling the winding circuits thereof.

In single phase induction motors, one or more main or running windings are generally provided together with at least one starting winding, which is physically and electrically displaced from the main winding. Energization of the main and start windings during starting conditions produces two phase starting flux which is effective to create a starting torque and cause the rotor of the motor to rotate. If the starting windings are not energized when the motor is in a locked rotor condition with the main windings energized, the main windings will burn out. Thus it is of great importance that means be provided to reliably energize the start windings when the motor is first starting. However, the start winding is normally built for selective energization only and must be de-energized before the motor attains a normal running speed with the main winding still energized, or the start windings will also burn out. It is, therefore, also very important to have means, reliable in operation, for de-energizing the starting windings at a predetermined speed usually less than the normal running speed of the motor.

One of the more desirable approaches for controlling the selective energization of the starting windings in a dynamoelectric machine, especially from the standpoint of economy, has been to use a system that employs a switch assembly operated by a speed responsive switch actuating device. As a practical matter, however, continued reliability of this type of system is difficult to obtain because of the tendency of the operating characteristics of the system to change during the life of the machine.

In studying this problem, I have determined several factors which contribute to the tendency in this type of system of the operating characteristics to change appreciably over the life of the machine.

One of the factors is related to reaction surface wear in the switch assembly and speed responsive switch actuating device. It has been extremely difficult to cope with this problem heretofore because it has been quite desirable, in order to separate welded contacts in the switch assembly, to use switch actuating means characterized by relatively high reaction forces. High reaction forces, in turn, tend to increase the wear of the reaction surfaces and produce a change in the force-deflection characteristics of the switch actuating means. This, in turn, results in ever-increasing changes in the operating characteristics of the system as a whole.

A readily observable change in operating characteristics is the occurrence of starting winding deenergization at progressively higher speeds during the life of the motor. This change appears to be ascribable to a need for increased centrifugal forces in the speed responsive switch actuating device to compensate for reductions in reaction forces accompanying wear of the reaction surfaces.

These changes are especially critical in certain applications, such as in commercial drying machines. In this type of application, a dynamoelectric machine may be mechanically driven, for many hours below "cut-out" speed, with the reaction surfaces in rubbing engagement with each other.

Another factor affecting the tendency of the operating characteristics to change is related to dust. I have observed in some environmental applications that the start windings either are not energized when power is initially supplied to the motor, or remain energized after running speed is attained. A study of motors used in certain of these applications has revealed an accumulation of foreign particles on the contacts in the switch assembly. If these particles are electrically insulating, the contacts fail to complete an electrical circuit for energizing the starting windings. On the other hand, when the particles are electrically conductive, they bridge the contact gap, maintain the electrical circuit, and prevent deenergization of the starting windings.

It can thus be seen that there is need for a system that will reliably energize the starting windings in a motor in a split-phase, single-phase induction motor when the main or running windings are first energized and which will reliably and accurately deenergize the starting windings when a predetermined "cut-out" speed is attained. It is desirable that such a system be provided with dust protection means and also with means supplying reaction forces of sufficient magnitude to open welded contacts. In addition, it is desirable that the reaction forces in the system be minimized so as to prevent wear and concomitant inaccurate operation.

Accordingly, it is the primary object of this invention to provide an improved switch assembly for use in a dynamoelectric machine, and more particularly, to provide an improved switch assembly for controlling the energization of the excitation windings of a split-phase motor, which is adapted for use with a standard speed responsive switch actuating device.

A more specific object of this invention is to provide a switch assembly, inexpensive to manufacture, that provides long service life in various applications including those where a motor is driven by inertial load forces for relatively long periods of time after the motor has been deenergized.

Another object of this invention is to provide a new and improved switch assembly which exhibits operating characteristics that do not change appreciably over the operating life of a dynamoelectric machine and prevents the accumulation of foreign particles on the contact elements in sufficient amounts to interfere with the proper operation of the switch assembly.

Another object of the present invention is to provide improved and efficient switch assemblies for use in controlling dynamoelectric machine winding circuits which overcome at least some of the problems mentioned above.

In carrying out the objects of this invention in one form thereof, I provide an improved switch assembly particularly suitable for use with a speed responsive switch actuating device in a single phase, split-phase motor. In the preferred embodiment, the assembly includes a plural section composite spring having a switch operating means in the form of an actuating arm with a free end. Attached to the free end of the spring arm is a cross arm and wear pad. A movable contact element in the form of a side spring portion projects laterally from the actuating arm, and has a free end that is engageable with the cross arm. When the contact elements are closed, the cross arm underlies and is spaced from the movable contact element, but as the push collar of a conventional switch operator moves away from the free end of the actuating means, the cross arm strikes the movable contact element. This striking or impacting action is accompanied by a twisting action due to the offset nature of the contact surface of the side spring. These actions tend to break the weld at the interface of the contacts and accomplish sudden separation of the contact elements. It will be seen, therefore, that the use of my composite spring section provides a "hammering" and "prying" open of the contact elements, and permits the use of switch operating means that is biased by a spring having a relatively low spring constant, thus reducing wear on the operating means and actuating device member or push collar. I have also provided in one embodiment of my invention dust excluding enclosure means for relatively movable contact elements to insure, in adverse foreign particle laden environments, continued reliable operation of my switch assembly.

The subject matter which I regard as my invention is particularly pointed out and distinctly claimed in the concluding portion of this specification. My invention itself, however, both as to its organization and mode of operation, together with further objects and advantages thereof, may best be understood by reference to the following description taken in connection with the accompanying drawings in which:

FIGURE 1 is a side elevation view, partly in section, of one end of a small horsepower single phase, split-phase induction motor which incorporates therein one form of the improved switch assembly of this invention;

FIGURE 2 is an enlarged, exploded perspective view of one embodiment of a switch assembly incorporating features of my invention;

FIGURE 3 is an enlarged elevational view, partly in section, illustrating one embodiment of my invention pertaining to enclosure means for a pair of relatively movable contacts and wherein the contacts are shown in closed position;

FIGURE 4 is an enlarged side elevational view, partly in section, similar to FIGURE 3, the contacts being shown in open position;

FIGURE 5 is an enlarged bottom plan view showing a preferred switch actuating means and movable contact element used in one embodiment of my invention;

FIGURE 6 is an enlarged side elevational view of the structure shown in FIGURE 5;

FIGURE 7 is a graph showing the representative relationships of the force required to produce axial deflection of the free end of a switch actuating means in a switch assembly of a given size constructed in accordance with my invention; as compared with a selected switch assembly of the same size and of the type where the movable contact element is carried by the switch actuating means;

FIGURE 8 is an enlarged plan view of a portion of yet another embodiment of my improved switch assembly wherein the switch actuating means incorporates two laterally extending auxiliary spring sections;

FIGURE 9 is an enlarged front elevational view of the switch assembly shown in FIGURE 8; and FIGURE 10 is a schematic circuit diagram illustrating the improved switch assembly of FIGURES 8 and 9 in the motor circuit of a single phase, split-phase motor adapted for two speed operation.

Referring now to the drawings in more detail, and specifically to FIGURE 1, I have illustrated one form of my invention as being incorporated in a single phase, split-phase induction motor 20 having a stationary core member or stator 21 of conventional construction and a rotor 22 fixedly secured to shaft 23. The rotor is shown as being provided with the well-known cast squirrel cage winding. Stator 21 is supported within a cylindrical shell 24, closed at each end by an end shield assembly 28 which is secured to shell 24 and held in assembled relation therewith by means of bolts 29. For simplicity of illustration, only one end frame of a motor is shown formed with a bearing housing 27 in which is housed a bearing (not shown) rotatably supporting one end of shaft 23. The other end frame, if desired, may be similarly constructed. The single phase motor 20 of the exemplification under consideration is of the split-phase type, in which stator 21 carries one main winding 25 and one start winding 26 which is energized with the main winding 25 during the starting condition to effect rotation of rotor 22. In the exemplification, one preferred form of my improved switch assembly, generally identified by numeral 30, controls the energization and deenergization of the starting winding. That is, when rotor 22 is turning at speeds above a predetermined level, switch assembly 30 is in an "open" condition whereby start winding 26 is deenergized. However, at speeds of rotation of rotor 22 below a predetermined level, switch 30 is in a fully closed position as shown in FIGURE 1.

Any suitable speed responsive actuating device may be used to operate switch assembly 30. Merely for purposes of illustration, I have shown a device 31 of the type disclosed in the United States Patent application of James L. Waters, Ser. No. 306,815, filed Sept. 5, 1963 and assigned to the same assignee as the present application.

The device 31 has a weight supporting plate mounted on an end ring of the rotor 22. A pair of weights 32 are supported for pivotal and radial movement on the supporting plate and can react to centrifugal force at a predetermined speed to move radially outwardly and move push collar 33 axially along shaft 23. A pair of tension springs 34 resiliently bias the weights 32 radially inwardly in the well-known fashion and hold the push collar 33 in the outward position as shown in FIGURE 1. As the rotor 22 starts to rotate, the centrifugal weight members 32 rotate with the rotor. When a predetermined speed of rotation is reached, the centrifugal force exerted by the weight members 32 overcomes the opposing force of the springs 34 and causes weight members 32 to move radially outwardly on the support plate with a pivotal movement. This pivotal movement results in an axial displacement of the push collar 33 to an inward position as shown in FIGURE 6. In the inward position, which corresponds to operation of the motor at normal running speed, the switch assembly is in open condition, also shown in FIGURE 6.

As revealed in FIGURE 1, I have mounted my switch assembly 30 within the shell 24 on the terminal board member 40, in operative relation with push collar 33. Several mounting lugs and brackets denoted at 35 and 36 secure the terminal board to the shell. To conveniently supply power to the motor I provide terminal posts 41 and 42 on the terminal board which are connected to power leads 43 and 44. These leads are adapted to be connected to any suitable power source such as an alternating current source.

One end of starting winding 26 is connected by a conventional female quick connect member (not shown) to male connector 46 integral with terminal post 42 and the other end of the starting winding is connected through lead wire 47 and a conventional female quick connect member to male connector 49 on bracket member 50. The running winding is adapted to be connected in parallel circuit with the starting winding across the power source by means of conventional female quick connect members (not shown) that engage a conventional male connector 45 integral with terminal post 42 and a conventional male connector (not shown) integral with terminal post 41.

Referring now to the preferred embodiment of my switch assembly, it will be seen from an inspection of FIGURE 2 that the assembly 30 includes a U-shaped bracket member 50, having a bight portion 51, a first upstanding bifurcated end presenting a pair of upstanding portions 53 and a third upstanding portion 52 at the other end. The bracket member 50 is made of electrically conductive material, such as steel.

In order to accurately locate and support composite spring 60, I provide means including a shelf 54 on upstanding portion 52 of the bracket. This means also includes projections 55 which are useful for welding composite spring member 60 to the shelf. Moats 56 furnish a sump into which excess weld material can flow when projections 55 on shelf 54 are welded to spring member 60. In order to limit movement of the composite spring, I supply stop means in the form of bearing faces on bent portions 57 at the end of uprights 53. A terminal board 40, preferably formed of insulating material such as fiberboard, supports a fixed contact element 58 which includes a contact surface in the form of contact 48. The terminal board is held in assembled relationship with the bracket member by suitable fastening means such as a rivet passing through holes in the bracket and terminal board.

Composite spring member 60 is preferably punched and formed from a relatively thin electrically conductive material, such as a copper alloy strip approximately .009 of an inch thick, and is shown in FIGURES 2, 5 and 6 as including a switch actuating means in the form of an actuator arm spring section 61. The composite member 60 also includes a movable contact element in the form of a side spring section 65 carrying a contact surface in the form of contact 68. Side spring 65, as seen in FIGURE 5, has a first portion 66 directed generally away from the motor axis and a second portion directed generally along dashed line T toward the motor axis.

To impart structural rigidity to parts of switch actuating means 61 and contact element 65, I provide stiffening means, that in the present exemplification, take the form of ribs 62 and 67. In order to prolong the service life of the switch assembly, I provide wear pad 64, preferably formed of a nylon-Teflon plastic material, attached with a cross arm 63 to the free end of the switch actuating means 61. Although the cross arm and wear pad are illustrated as two separate elements, it will be understood that if desired, they could be integrally formed from suitable material having low wear properties.

With reference to FIGURES 5 and 6, it will be understood that the movable contact element 65 is deflected to permit the cross arm 63 to be assembled to the switch actuating means and serve as an abutment means for the movable contact element. The initial deflection holds the free end of the movable contact element in abutment with the bearing surface 79 presented by the cross arm, and "prebiases" the movable contact element.

Now having reference to FIGURES 1-4, the operation of the improved switch assembly 30, embodying my invention, will be explained. When the motor is first energized and the rotor is at rest, the contact element 65 is deflected with respect to switch actuating means 61 and the contacts 48, 68 are closed, as shown in solid lines in FIGURE 3. In some applications, the starting winding current flowing through these contacts causes them to temporarily weld together at their interface.

As the motor comes up to "cut-out," and then running speed, the centrifugal weights 32 overcome the bias of springs 34 and retract the push collar from the switch actuating means (in a direction towards the right as viewed in FIGURE 1). The spring force of the depressed switch actuating means tends to pivot the wear pad end of this means in the same direction and maintain a pressure engagement between wear pad 64 and the push collar 33.

The flexibility of contact element 65 in the portion 66 between the contact 68 and the point of attachment of the contact element 65 to means 61, permits the contact element 65 to act as a lever and tend to "pry" the welded contacts 48, 68 apart (as opposed to "pulling" the weld apart by substantially pure tension forces). The twisting of the contact element 65 takes place in two planes because of the offset nature of the element 65 relative to the switch actuating means 61 and the eccentric location of the contacts relative to the switch actuating means as illustrated in FIGURE 5.

This "prying" action tends to twist the contact 68 on the face of contact 48 from the fully closed position shown in solid lines in FIGURE 3, to an initially closed position shown (slightly exaggerated) in dotted lines in FIGURE 3. As previously mentioned, the deflection of contact element 65 takes place in two planes, and the nature of this motion is best explained by having reference to dashed lines S, U, and T in FIGURE 5.

The switch actuating means 61 tends to pivot about line S and carry portion 66 of contact element 65 with it. Contact element 65, however, additionally tends to pivot about the two instantaneous axes T and U (along the contact interface) while it is moving from a fully closed position to an initially closed position. This multiple pivoting action causes the deflection of element 65 in more than one plane.

Substantially simultaneously with the initiation of the "prying" action, bearing surfaces 79 of cross arm 63 strikes contact element 65 and helps separate the contacts 48, 68. The stiffening means 62 and 67 on the switch actuating means and contact element make these members relatively rigid in the vicinity of their free ends. Accordingly, resilient absorption of the impact of the cross arm against the contact element is substantially precluded.

It will be understood that the above described sequence of events occurs during a relatively short interval of time, and that as the motor increases from "cut-out" to running speed, the push collar moves out of engagement with the wear pad 64 as shown in FIGURE 6.

When the motor is deenergized, it reduces speed, the push collar reengages the switch actuating means and closes the switch assembly in preparation for the next starting cycle.

It should now be apparent that the illustrated switch embodying my invention employs a combination of twisting and striking actions to separate the contact elements instead of employing a relatively stiff spring with the switch actuating means to break the contact weld by a "pulling" action, as has been done heretofore. It will therefore be understood that the preferred embodiment of my invention permits the use of a relatively resilient switch actuating means and thereby substantially reduces the wear on collar 33 and the end of the switch actuating means 61. The significance of my invention is partially illustrated by the results of tests comparing switching systems embodying my invention and mechanisms known in the prior art. Representative mechanisms of a given size constructed in accordance with my invention show negligable wear after 1,500,000 cycles of operation and correspondingly no appreciable change in cut-out speed; whereas other tested mechanisms that do not embody my invention, after the same number of operations, manifest such great amounts of wear that the cut-out speed is nearly equal to the running speed and any further wear would prevent the switch from opening the start circuit at all and cause the starting windings to burn.

FIGURE 7 graphically contrasts the type of forces experienced on the free end of a switch actuating means in switch assemblies of a given size embodying my invention and on switch assemblies using the same speed responsive switch actuating device that do not employ my invention. The dashed line curve represents operating relationships for a switch assembly constructed without reference to my inventive teaching and the solid line curve corresponds to data obtained from tests of an assembly embodying my invention and illustrated in FIGURES 5 and 6.

In the representative prior art switch assemblies corresponding to the dashed line curve, a force of approximately 90 grams must be applied to the free end of the switch actuating means, and this end must be deflected .010 of an inch before the switch actuator leaves the spring stop; the point of departure from the stop being indicated by the point A' on the broken line curve. Portion A'-C' of this curve indicates the force required in grams, on the wear pad to deflect the switch actuator to a point of contact closing. After point C' is reached, further deflection of the free end of the spring arm may be obtained only by applying increasingly larger increments of force to the free end of the switch actuating means. Thus, to achieve a free end deflection in the neighborhood of .180 of an inch (corresponding to point D') approximately 250 grams force should be applied to the wear pad.

By comparison, the free end of a switch assembly constructed in accordance with my invention, of the same size, and employing the same speed responsive device, is deflected .180 of an inch (point D) by a force application in the order of 90 grams. Thus, it can be seen that to produce the same deflection, a switch assembly embodying my invention necessitates the use of merely 36% of the force required heretofore. This in turn reduces the rate of wear of the cooperating reaction surfaces on the push collar and switch actuating means in the assembly and consequently reduces the tendency of the switching system characteristics to change.

Still having general reference to FIGURE 7 and more particularly having reference to point A on the solid curve, it will be seen that an initial application of approximately 45 grams pressure will cause my actuating means 61 to leave the stops 57. The portion of the curve A-B reveals the force required to deflect my actuating means to a point where the contacts initially close. The increase in force from B to C without a corresponding increase in axial deflection of the wear pad is caused by the "prebias" present in contact element 65. In other words, the contacts in the exemplification of my improved assembly engage with an initial contact pressure of approximately 12-16 grams. Continued axial deflection of the wear pad in my improved switching arrangement is realized by a relatively small increase in actuating force as illustrated by the solid line C-D.

A comparison of the slopes of curve portions C'-D' and C-D will reveal that the wear pad of my improved switch assembly deflected .001 of an inch with an application of only approximately .2 gram force. In contrast to this, the prior art switch assembly required approximately .9 gram for an equal amount of wear pad deflection. It will be understood, that as the push collar and wear pad erode, the axial deflection of the free end of the switch actuator decreases and causes a corresponding decrease in force on the free end of the switch actuator as indicated by curve portions D'-C' and D-C.

The change in force exerted by the wear pad against the push collar in the mechanism that does not embody my invention causes a change in the operating characteristics of the switching system and a corresponding change in cut-out speed. In contradistinction, the relatively constant force applied against the push collar by my improved switch assembly, regardless of the degree of wear, has no appreciable effect on the operating characteristics of the switching system. Accordingly, the cut-out speed in the improved system remains substantially constant.

Reference now to FIGURES 3 and 4 will reveal dust excluding means embodying yet another aspect of my invention. Having particular reference to FIGURE 3, I show the foreign particle excluding means that includes a contact cover 102, preferably made of fire resistant material, such as steel, having a depending skirt portion 104 and a flange portion 103 tightly fitted around the base of movable contact 68. My foreign particle excluding means, in the present exemplification, also includes a filter 100 resiliently engaging the contact element 58.

The filter is preferably made of a very resilient filter material, such as porous open-cell type urethane foam having a maximum pore size of approximately .007 of an inch. I provide the filter 100 with engaging means that, in the present exemplification, takes the form of a circular groove 106 in one surface corresponding to and engaging skirt portion 104 of cover 102. These means are arranged so that the resiliently engaged portion of the cover 102 forms a dust excluding seal with the foreign particle excluding means around the contacts.

In the exemplification, the filter 100, being made of very resilient and easily deformed material, permits contact 68 and 48 to close without restraining the movement of contact elements 65. However, a less resilient foreign particle excluding means may be used provided the "prebias" in the contact element is increased by bending it before assembly of the cross arm to the composite spring.

To prevent damage to the filter element 100 by arcs created when contacts 68 and 48 break open, I provide spark protection means in the form of a washer 101. Preferably, this washer is made of melamine glass or other suitable arc resistant material, which cooperates with the steel cover to confine the arc. It will thus be understood that the arrangement shown in FIGURES 3 and 4 excludes substantially all foreign particles from the enclosed contact elements.

It will also be understood that my foreign particle excluding means could be embodied in forms other than the illustrated form of filter and cover, and exclude substantially all foreign particles from the protected contact elements. Thus, the particle-excluding means could be made of a nonporous single-piece flexible rubber-like material forming a tight mechanical fit around the stationary and movable contact elements.

For example, I have found that I can make my dust excluding means in the form of a sleeve that has contact element engaging means in the form of a flanged opening at both of its ends. The flanged openings are configured to tightly engage the movable and stationary contact elements. Thus, one flanged opening will tightly encircle the contact surface of contact element 65, and the other flanged opening will resiliently engage contact element 58 to furnish an imperforate flexible enclosure containing the contact surfaces of both contact elements.

In practice, I have found that dust excluding means in the form of a sleeve may present an undesirable resistance to the closing of the contact elements. In these situations, I have found that I can mold the sleeve with a circular pleat in one of the flanges. The pleat then reduces the resistance of the sleeve to axial compression and deformation.

I have shown, in FIGURES 9 and 10, a switch assembly that illustrates a modified embodiment of my invention, where identical parts are identified by identical reference numerals. The switch assembly of FIGURES 9 and 10 differs principally from the switch assembly shown in FIGURES 1-6 in that it is especially adapted for operation with a multispeed dynamoelectric machine.

A composite spring section generally identified by the numeral 80 includes switch actuating means 81 having a free end, and movable contact elements 83 and 85. The free end of the actuating means 81 and each of the movable contact elements 83 and 85 are provided with stiffening means that take the form of ribs, as indicated by the numerals 82, 84 and 86.

Composite spring section 80 is supported by bracket supporting member 50 in the same manner as composite spring section 60 in the earlier described embodiment. However, bracket support member 50 is provided with only one upstanding portion 53.

As revealed in FIGURE 9, the movable contact element 85 carries a contact 87 engageable with a contact 71 forming a part of fixed contact element 76. Movable contact element 83 carries a pair of oppositely facing contacts 88 and 89 for engagement with a pair of oppositely disposed fixed contacts 72 and 73. The fixed contact 73 is used for completing an electrical circuit and also serves as a mechanical stop for side spring 83.

The operation of the switch assembly including composite spring section 80 when used with a two speed, single phase, split-phase induction motor will be understood by having reference to FIGURE 10. Speed selector switch 98 is shown in a low speed running position and the switch assembly is illustrated in the position corresponding to the starting condition of motor 97.

During the time that the motor is starting, suitable power is supplied through lead 92, the selector switch 98, and lead 91 to terminal 49 on bracket member 50. As bracket member 50 and composite spring 80 are formed of an electrically conductive material, power is transmitted to the start winding through closed contacts 87, 71 and then through lead 96 to a starting capacitor 90. The other end of the start winding is connected to power supply lead 93. Power is also supplied through bracket member 50 and composite spring section 80 to contact pair 89, 72, terminal 75 and lead 95, to one end of the high speed winding.

During the starting condition of motor 97, the low speed winding is not energized because contact pair 73, 88 are open. However, as the motor comes up to a predetermined cut-out speed, the switch assembly moves to the position illustrated in FIGURE 9 wherein contact pair 73, 88 are in electrical engagement with one another and contact pairs 71, 87 and 72, 89 are open. Accordingly, the power supply circuits for the start and high speed windings are interrupted while a power supplying circuit is completed for the low speed winding through contact pair 73, 88, terminal 74 and lead 94.

In order to operate motor 97 at high speed, speed selector switch 98 is set for high speed operation as indicated by the dotted line position of switch 98 in FIGURE 10. Power is supplied from lead 92 through switch 98 to lead 95 and the high speed winding is continuously energized. The start winding receives power, during starting conditions, from a circuit including lead 92, switch 98, lead 95 connected to terminal 75, contact pairs 72, 89 and 87, 71 and lead 96. When motor 97 comes up to a predetermined running speed, the switch assembly shifts to the position shown in FIGURE 9 and, due to the opening of contact pair 72, 89, the start winding is deenergized.

I have not illustrated dust enclosure means in conjunction with the structure shown in FIGURES 8 through 10. However, it should be understood that my dust enclosure means may be used in conjunction with the switch assembly of either FIGURE 2 or FIGURES 8–10.

It will be recognized from the foregoing that I have provided an improved, yet low cost switch assembly adaptable for use with standard speed responsive switch actuating devices to form a switching system that manifests no appreciable changes in operating characteristics during its operating life.

Fabrication of the switch assembly is relatively inexpensive since I form the components by low cost manufacturing techniques and effect a savings in material. Moreover, the parts are easily assembled and a complete unit may readily be mounted in a motor.

It should be apparent to those skilled in the art, that while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations that fall within the true scope of the invention.

What I claim as new and desire to secure by Letters Patent of the United States is:

1. In a single phase motor having at least two excitation windings, a motor frame, a speed responsive switch actuating device having a member movable in response to the speed of the motor; and a switch assembly mounted to the frame in cooperative relation to the speed responsive device for controlling at least one of the excitation windings, said switch assembly comprising: support means; a first contact element fixed to the support means; switch operating means secured to the support means and having a free end movable relative to the support means in response to the position of the actuating device member; bracket means positioned on said support means; a composite spring mounted on said bracket means in pivotal relation hereto, said composite spring having a side spring section defining an area having at least two pivotal axes positioned in the plane of said side spring section; a second contact element mounted on said area movable by and relative to the switch operating means between fully closed, initially closed, and open positions relative to said first contact element whereby a surface of the second contact element selectively engages a surface of the first contact element to selectively energize at least part of the excitation windings; means for biasing the free end of the switch operating means toward the actuating device member; abutment means fixed to the switch operating means adjacent the free end thereof; and means for biasing the second contact element toward the abutment means and against the first contact element when the second contact element is in a fully closed position relative to the first contact element; whereby the switch operating means and abutment means move in a direction away from the first contact element in response to movement of the actuating device member away from the switch operating means, the abutment means striking the second contact element and producing sudden separation of the first and second contact elements.

2. The structure of claim 1 wherein the switch assembly includes a third contact element having a free end movable relative to the switch operating means; means biasing said third contact element in generally the same direction as the second contact element and against said abutment means when the second contact element is in an open position relative to the first contact element; and a pair of spaced contact elements fixed to the support means adjacent the third contact element for selective engagement by the third contact element whereby at least part of the excitation windings are energized.

3. The structure of claim 1 wherein the support means includes a U-shaped bracket member having a first upstanding end and a second bifurcated upstanding end, whereby the composite spring section is secured to and supported by said first upstanding end.

4. In a dynamoelectric machine having a stator carrying at least two windings and a speed responsive member movable axially in response to the speed of the machine, a switch assembly for controlling the excitation of the windings in cooperative relation to the speed responsive member, said switch assembly comprising: a first stationary contact element; a second contact element supported for selective movement relative to said first contact element between an open position, an initially closed position, and a fully closed position for selectively energizing one of said windings; switch operating means movable in response to engagement by the axially movable member; said second contact element being mounted for movement by the switch operating means, said second contact element being mounted on a flat spring defining a twist axis for twisting the second contact element relative to the first contact element as the second contact element moves between the fully closed and initially closed positions, whereby the twisting action of the second contact element relative to the first contact element tends to pry apart and separate suddenly the first and second contact elements as the switch operating means moves in response to movement of the axially movable member during the starting condition of the machine.

5. The switch assembly set forth in claim 4 wherein said contact elements each include a contact surface, dust excluding means having a flexible member resiliently engaging said first and second contact elements and forming therewith an enclosure for encompassing the contact surface of said first and second contact elements without impeding the twisting action of said second contact element relative to said first contact element.

6. The switch assembly of claim 4 including abutment means for striking said second contact element to move said second contact element from said fully closed position to an open position relative to said first contact element whereby the striking action augments the twisting action thereby tending to insure sudden separation of the first and second contact elements.

7. The switch assembly of claim 4 wherein said switch operating means includes a pivotally mounted spring arm and the flat spring extends laterally from said spring arm to position a contact surface offset from the arm thereby to provide a twisting action of the surface as the second contact element moves between the fully closed and initially closed positions.

8. The switch assembly of claim 7 wherein the spring arm moves about a first axis and the laterally extending spring portion moves about a second axis, such that the second axis is substantially the same as the first axis when the second contact element is in the open position, and the second axis is nonparallel to the first axis when the second contact element moves between the initial and fully closed positions.

9. The switch assembly of claim 4 wherein the operating means moves about a first axis and the second contact element moves about a second axis, such that the second axis is substantially the same as the first axis when the second contact element is in the open position, and the second axis is nonparallel to the first axis when the second contact element moves between the initial and fully closed positions.

10. In a switch assembly for selectively energizing the excitation windings of a dynamoelectric machine, a pair of relatively movable contact elements having generally opposed surfaces with contact surfaces on each contact element; dust excluding means located between said generally opposed surfaces and engaging said contact elements and forming with said contact elements an enclosure encompassing said contact surfaces, said dust excluding means including a flexible member whereby the movement of the contact elements relative to each other is not impeded by the dust excluding means.

11. The switch assembly of claim 10 wherein at least one contact element is mounted for twisting movement relative to the other; said dust excluding means includes a contact cover having a flange surrounding one of the contact surfaces; and said flexible member resiliently engages said flange and surrounds the other of said contact surfaces whereby the relative twisting movement of the contact elements is not impeded by the dust excluding means.

References Cited

UNITED STATES PATENTS

| | | |
|---|---|---|
| 1,493,038 | 5/1924 | Huseth et al. |
| 2,305,441 | 12/1942 | Pepper _____ 200—80 |
| 2,631,205 | 3/1953 | Millard. |
| 2,683,844 | 7/1954 | Schaefer _____ 200—80 X |
| 2,806,917 | 9/1957 | Hupp et al. _____ 200—80 |
| 2,831,092 | 4/1958 | Moodie. |
| 2,899,512 | 8/1959 | Burch. |

ROBERT K. SCHAEFER, Primary Examiner.

D. SMITH, JR., Assistant Examiner.

U.S. Cl. X.R.

200—67, 168